United States Patent
Denisova et al.

(10) Patent No.: US 12,025,019 B2
(45) Date of Patent: Jul. 2, 2024

(54) HEATSHIELD FOR A GAS TURBINE ENGINE

(71) Applicant: Siemens Energy Global GmbH & Co. KG, Bayern (DE)

(72) Inventors: Ksenia Denisova, Finspang (SE); Alexander Fakeev, Moscow (RU); Ilya Fedorov, Norrkoping (SE); Omid Lorestani, Stockholm (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 52 days.

(21) Appl. No.: 17/609,375

(22) PCT Filed: May 20, 2020

(86) PCT No.: PCT/EP2020/064027
§ 371 (c)(1),
(2) Date: Nov. 6, 2021

(87) PCT Pub. No.: WO2020/239560
PCT Pub. Date: Dec. 3, 2020

(65) Prior Publication Data
US 2022/0213809 A1    Jul. 7, 2022

(30) Foreign Application Priority Data

May 29, 2019    (GB) .................................. 1907545.6

(51) Int. Cl.
*F01D 11/08*    (2006.01)
*F01D 11/24*    (2006.01)
(Continued)

(52) U.S. Cl.
CPC ............ *F01D 25/246* (2013.01); *F01D 11/24* (2013.01); *F01D 25/14* (2013.01);
(Continued)

(58) Field of Classification Search
CPC . F01D 11/08; F01D 11/24; F01D 9/04; F01D 25/24; F01D 25/246; F01D 25/243; F05D 2240/11
See application file for complete search history.

(56) References Cited

U.S. PATENT DOCUMENTS 4,526,226 A * 7/1985 Hsia .......................... F01P 1/00
                                                          165/170
5,988,975 A * 11/1999 Pizzi ..................... F01D 25/246
                                                          415/173.1
(Continued)

FOREIGN PATENT DOCUMENTS

EP        0516389 A2    12/1992
EP        1914390 A2     4/2008
(Continued)

OTHER PUBLICATIONS

International search report and written opinion dated Oct. 1, 2020, for corresponding PCT/EP2020/064027.

*Primary Examiner* — Brian P Wolcott
*Assistant Examiner* — Maxime M Adjagbe
(74) *Attorney, Agent, or Firm* — Wolter Van Dyke Davis, PLLC

(57) ABSTRACT

A heatshield for a gas turbine engine, includes a main body having a leading edge, a trailing edge, lateral edges, a first surface and a second surface. The first surface being exposed to a hot working gas in use passing through the gas turbine engine. The heatshield having a leading hook and a trailing hook each extending between the lateral edges, the leading hook and the trailing hook extending from the second surface. A stiffening structure extends from the leading hook to the trailing hook and free from direct contact or attachment to the second surface.

20 Claims, 6 Drawing Sheets

(51) Int. Cl.
*F01D 25/14* (2006.01)
*F01D 25/24* (2006.01)

(52) U.S. Cl.
CPC .... *F05D 2240/15* (2013.01); *F05D 2260/201* (2013.01); *F05D 2260/30* (2013.01)

(56) References Cited

U.S. PATENT DOCUMENTS

| | | | |
|---|---|---|---|
| 7,517,189 B2* | 4/2009 | Camus | F01D 9/04 |
| | | | 415/173.1 |
| 7,665,962 B1 | 2/2010 | Liang | |
| 8,118,548 B2* | 2/2012 | Nigmatulin | F01D 9/04 |
| | | | 415/173.1 |
| 8,251,637 B2* | 8/2012 | Lewis | F01D 11/12 |
| | | | 415/173.1 |
| 2004/0170496 A1 | 9/2004 | Powis et al. | |
| 2008/0089787 A1* | 4/2008 | Abdel-Messeh | F01D 11/005 |
| | | | 416/179 |
| 2008/0211192 A1 | 9/2008 | Pietraszkiewicz | |
| 2010/0307162 A1 | 12/2010 | Bottcher et al. | |
| 2013/0177412 A1* | 7/2013 | Weber | F01D 11/005 |
| | | | 415/209.3 |
| 2015/0030443 A1 | 1/2015 | Richardson et al. | |
| 2016/0208649 A1 | 7/2016 | Didion | |
| 2017/0356308 A1* | 12/2017 | Rammohan | B22F 5/009 |

FOREIGN PATENT DOCUMENTS

| | | |
|---|---|---|
| EP | 1965032 A2 | 9/2008 |
| RU | 2528217 C2 | 9/2014 |
| SU | 838290 A1 | 6/1981 |

\* cited by examiner

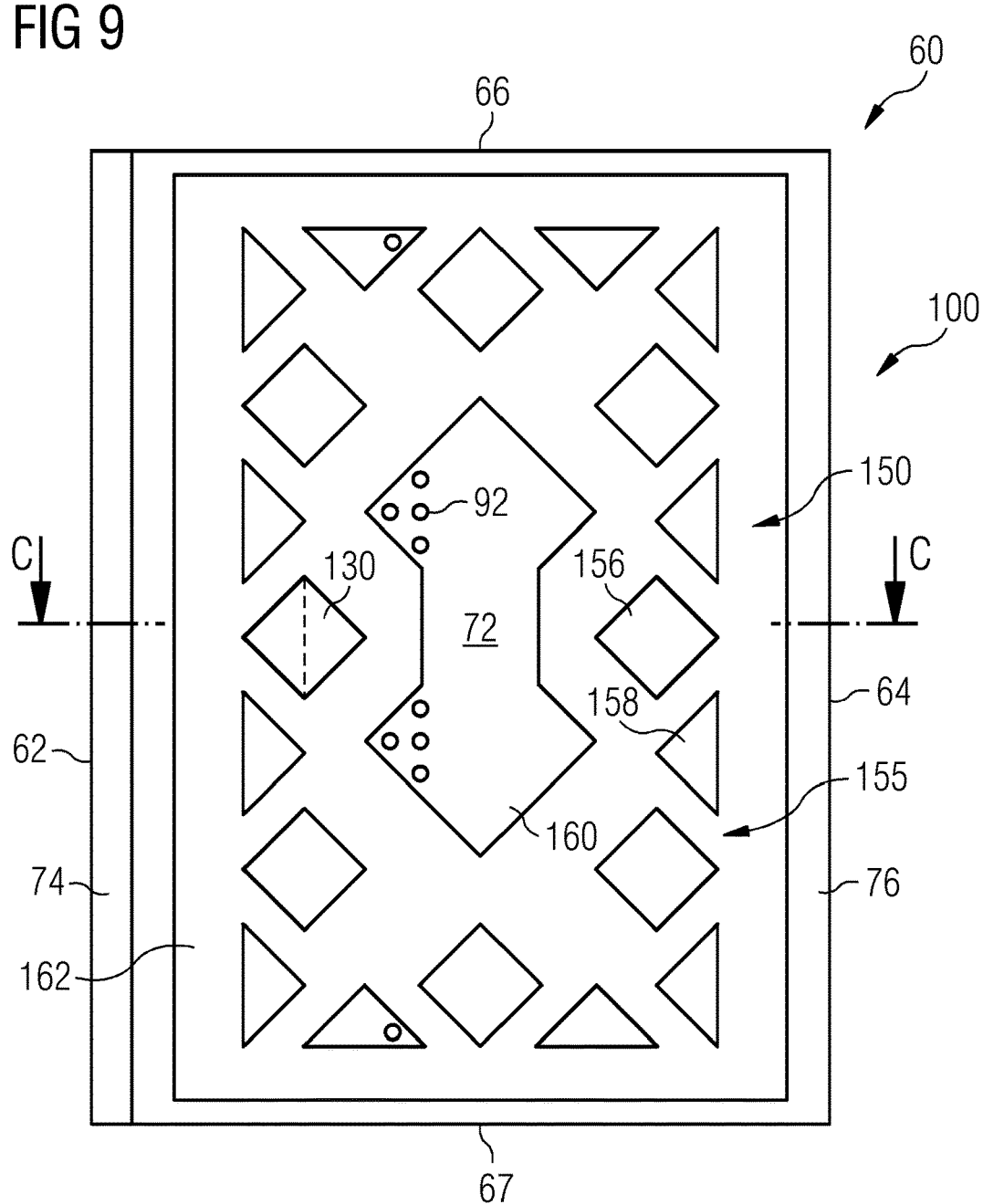

HEATSHIELD FOR A GAS TURBINE ENGINE

CROSS REFERENCE TO RELATED APPLICATIONS

This application is the U.S. National Stage of International Application No. PCT/EP2020/064027 filed 20 May 2020, and claims the benefit thereof. The International Application claims the benefit of United Kingdom Application No. GB 1907545.6 filed 29 May 2019. All of the applications are incorporated by reference herein in their entirety.

FIELD OF INVENTION

The present invention relates to a heatshield that may be used in a gas turbine engine and in particular a stiffening and flow-control feature to improve longevity of the heatshield.

BACKGROUND OF INVENTION

A heatshield can be found in several locations in a gas turbine engine and in particular the heatshield can be located radially outwardly of an annular array of turbine blades. The heatshield is usually a circumferential segment of an array of heatshields which are held in position by a carrier structure. The heatshield forms part of a gas-path which channels combustion gases through the turbine and drives turbine rotor blades in a conventional manner. These heatshields have a hot side, which is exposed to the hot working gases of the turbine, and a cold side facing radially outwardly, and which is often cooled with cooling air. It is important that there is a minimal gap between the tip of the blade and the heatshield to minimise over tip leakage and therefore minimise efficiency losses.

Conventionally, long ribs are provided on the cold side to stiffen the heatshield. The long ribs are integral or unitary with the cold side and form cooling channels. An impingement plate is brazed on the cold side and covers the long ribs. Cooling air is distributed along the cooling channels.

However, these heatshields incur high thermal gradients between their hot side and their cold side. Such thermal gradients create loading in the heatshield that causes material fatigue and distortion of the heatshields in operation. Distortion of the heatshield may lead to rubbing of the heatshield surface against rotating blade causing damage of both parts and subsequent turbine performance degradation. Stiffening features are necessary on the heatshield's cold side to resolve service life and distortion problems.

At the same time, the heatshield requires even distribution of the cooling air across the inlets of the heatshield cooling holes. Special design features are usually needed to achieve that, because cooling air supply from the carrier is typically very localized. Such cooling localisation can also incur localised thermal gradients.

Thus, it remains an objective to provide an improved heatshield which reduces distortion, reduces temperature gradients, reduces absolute temperatures and minimises the use of cooling air.

SUMMARY OF INVENTION

To address the problems of known coating systems there is provided a heatshield for a gas turbine engine, the heatshield comprising a main body having a leading edge, a trailing edge, lateral edges, a first surface and a second surface, the first surface being exposed to a hot working gas in use passing through the gas turbine engine, a leading hook and a trailing hook each extending between the lateral edges, the leading hook and the trailing hook extending from the second surface, characterised by a stiffening structure extending from the leading hook to the trailing hook and free from direct contact or attachment to the second surface.

The stiffening structure may be arranged in the general form of at least one X when looking towards the second surface.

The stiffening structure may comprise four arms. Two arms may attach to the leading hook. Two arms may attach to the trailing hook. The fours arms may meet at an intersection.

The stiffening structure may comprise an extended portion. The extended portion may extend between any one or more of the pairs of arms, arm 104A and arm 104B, arm 104B and arm 104C, arm 104C and arm 104D and arm 104A and arm 104D. In use, the extended portion may block the jet of coolant from impinging on second surface and/or at least one inlet defined in the second surface.

The heatshield may comprise a centre-line and perpendicular to the centre-line a line. An angle $\alpha$ is defined from an arm 104C to the line and an angle $\beta$ is defined from the arm 104C to another arm 104D, both arms 104C, 104D attached to the same leading or trailing hook. The ratio of angles may be angle $\alpha$/angle $\beta \geq 2$.

The stiffening structure may comprise one or more of the cross-sectional profiles: an I-beam, a T-beam, a box-beam or a rectangle.

The stiffening structure may be a beam arrangement. The beam arrangement comprising at least one beam, the at least one beam having at least one web and at least one flange.

The extended portion may be formed by an extension of the flange, advantageously the radially outer flange.

The stiffening structure may be a lattice structure.

The lattice structure may be an array of X-shaped elements, each X-shaped element having the arms.

The extended portion may not be connected to either of the leading hook or the trailing hook.

A gas turbine engine may comprise the heatshield as described above and a carrier. The carrier may be positioned radially outwardly of the heatshield and comprise corresponding engagement features to engage the leading hook and the trailing hook and at least one aperture for directing a coolant therethrough and towards the heatshield, the at least one aperture having a centre-line. The centre-line may intersect the stiffening structure such that the coolant at least partly impinges on the stiffening structure.

The centre-line may intersect the stiffening structure such that the coolant at least partly impinges on the extended portion.

The heatshield may be one of an annular array of heatshields and the carrier may be annular. The carrier may comprise an annular array of apertures. The centre-line of each aperture may be radially aligned with one of the heatshields and in particular the centre-line of each aperture may be radially aligned with one of the stiffening structures such that in use coolant impinges on the heatshield and in particular impinges on the stiffening structure.

BRIEF DESCRIPTION OF THE DRAWINGS

The abovementioned attributes and other features and advantages of this invention and the manner of attaining them will become more apparent and the invention itself will be better understood by reference to the following description of embodiments of the invention taken in conjunction with the accompanying drawings, wherein FIG. 9 is a view looking radially inwardly at an alternative embodiment of the heatshield and showing a fourth alternative stiffening structure, and FIG. 10 is a cross-section C-C through the fourth alternative of the heatshield in FIG. 9.

DETAILED DESCRIPTION OF INVENTION

Figure 1:
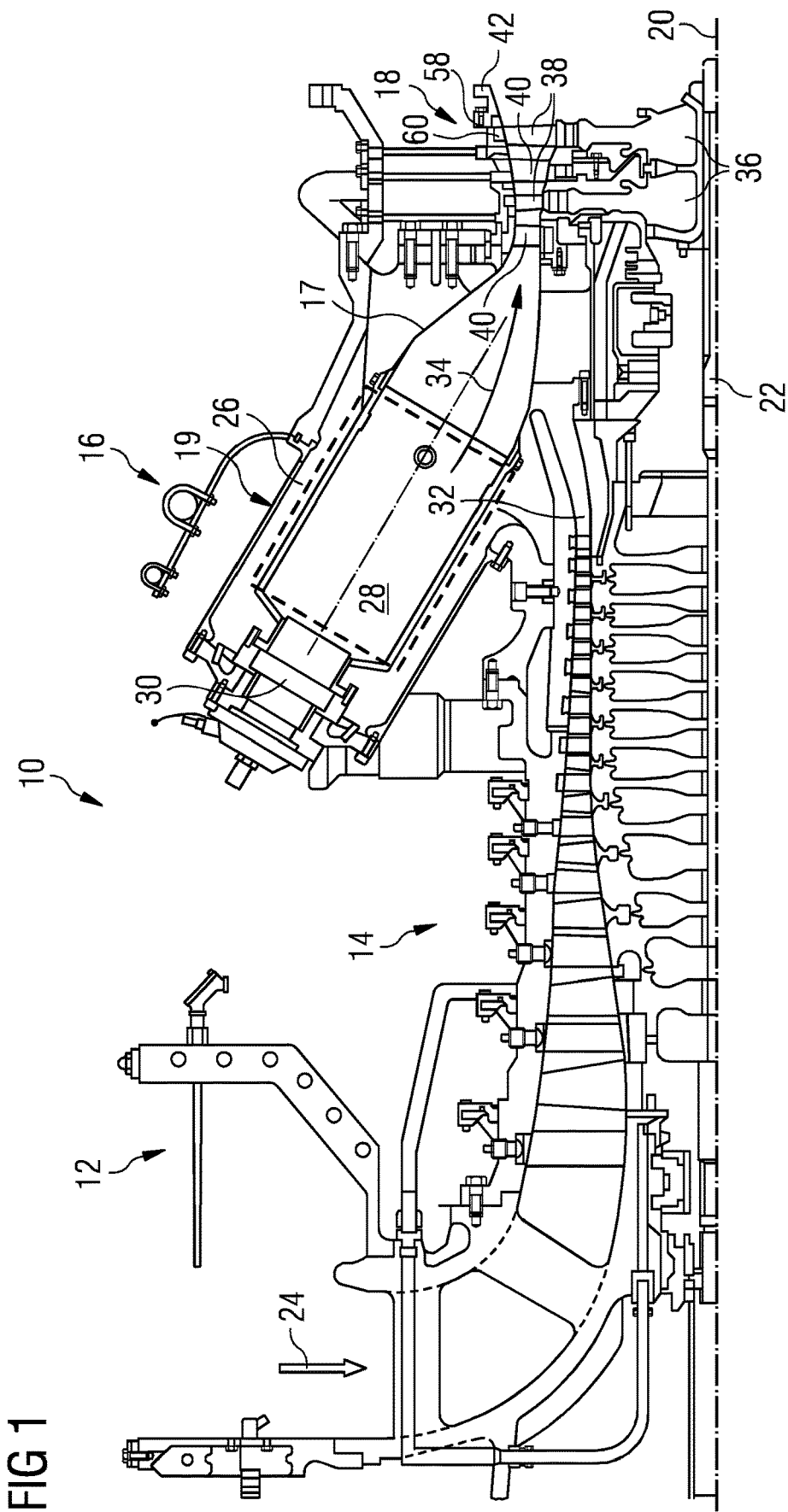
FIG. 1 shows part of a turbine engine in a sectional view and in which the present heatshield is incorporated.

FIG. 1 shows an example of a gas turbine engine 10 in a sectional view. The gas turbine engine 10 comprises, in flow series, an inlet 12, a compressor section 14, a combustor section 16 and a turbine section 18 which are generally arranged in flow series and generally about and along the direction of a longitudinal or rotational axis 20 in an axial turbine. The gas turbine engine 10 further comprises a shaft 22 which is rotatable about the rotational axis 20 and which extends longitudinally through the gas turbine engine 10. The shaft 22 drivingly connects the turbine section 18 and the compressor section 14.

In operation of the gas turbine engine 10, air 24, which is taken in through the air inlet 12 is compressed by the compressor section 14 and delivered to the combustion section or burner section 16. The burner section 16 comprises a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous and/or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustion chamber 28 and an outlet in the form of an annular segment. An annular array of transition duct outlets form an annulus for channelling the combustion gases to the turbine 18. In other examples, the combustor section 16 may be an annular combustor as known in the art.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 40 are provided and turn the flow of working gas onto the turbine blades 38.

The combustion gas from the combustion chamber 28 enters the turbine section 18 and drives the turbine blades 38 which in turn rotate the shaft 22. The guiding vanes 40 serve to optimise the angle of the combustion or working gas on the turbine blades 38.

The stator 42 of the turbine section 18 further comprises a carrier 58 and an annular array of heatshields 60 mounted to the carrier 58 and partly defining a working gas path through the turbine section. The heatshields 60 are mounted radially outwardly of the rotor blades 38. In other gas turbine engines, the heatshields 60 may be mounted between annular arrays of rotor blades 38 and/or may be mounted on the radially inner casing 56.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

The term 'heatshield' is used to denote not only a heatshield 60 as described herein, refers to a circumferential segment or a blade outer air seal (BOAS) or a shroud of a turbine system 18 of the gas turbine engine 10.

The present heatshield 60 will now be described with reference to FIGS. 2 to 10. Features of any one or more embodiment(s) may be combined with other embodiments as will be apparent to the skilled reader.

Figure 2:
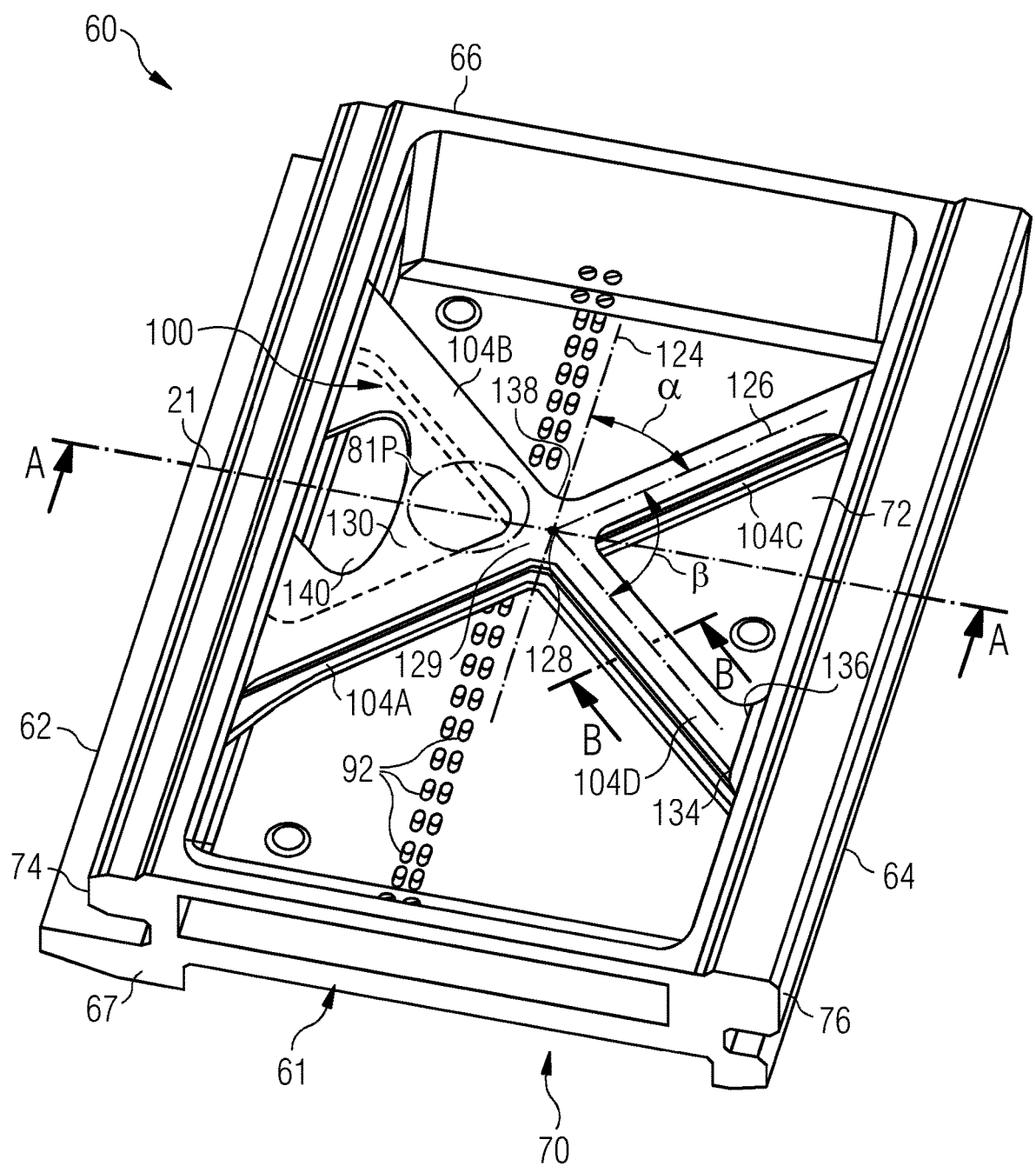
FIG. 2 is a perspective view of the present heatshield looking radially inwardly and circumferentially with respect to the rotational axis of the turbine engine, a first embodiment of a stiffening structure can be seen on the radially outer side of the heatshield.
Figure 3:
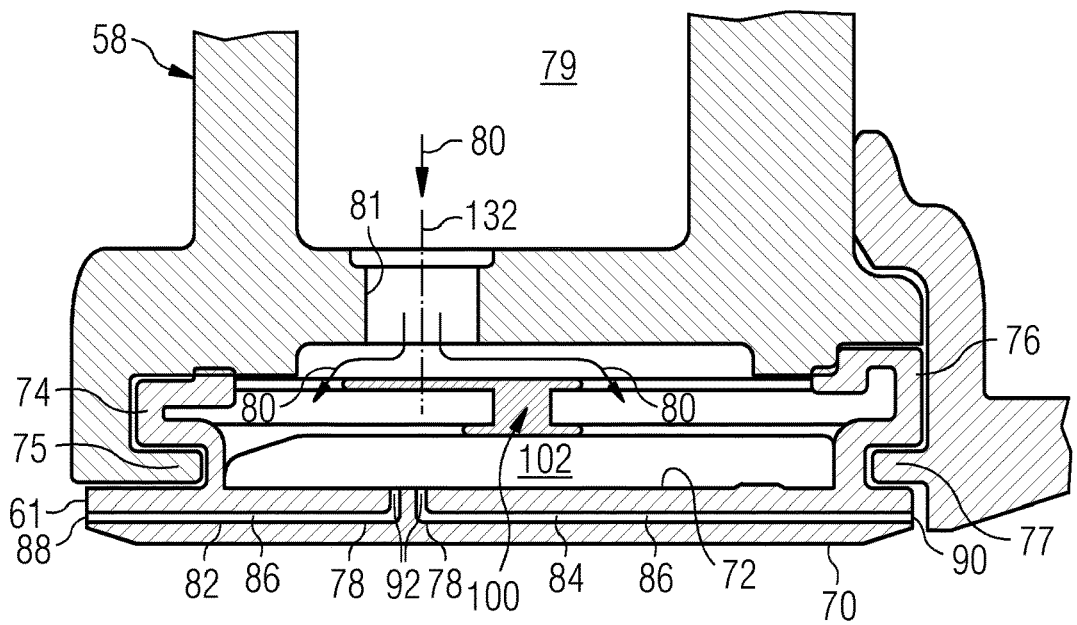
FIG. 3 is a section A-A of the present heatshield and a carrier for holding the heatshield.

Referring to FIGS. 2 to 3, the heatshield 60 is a circumferential segment of an annular array of circumferential segments 60 that form part of the gas washed outer surface of the gas path through the turbine section 18. The heatshield 60 is located radially outwardly of rotating blades 38 and where located axially adjacent the rotating blades, forms a tip gap therebetween.

The heatshield 60 has a main body 61, a leading edge 62, a trailing edge 64 and, when viewed looking axially downstream, to the left and to the right lateral edges 66, 67 respectively. When installed in a gas turbine engine immediately and circumferentially adjacent heatshields 60 may abut or be in close proximity to one another such that one left lateral edge 66 is facing one right lateral edge 67 and a gap may exist therebetween. The gap is sealed by a seal strip that is located in corresponding grooves in each lateral edge or surface of immediately adjacent heatshields as known in the art. The heatshield 60 has a first surface or gas washed surface 70, which is also a radially inner surface and that partly defines the radially outer gas washed surface of the gas path in the turbine section 18. The gas washed surface 70 may also be referred to as the hot side, that being subject to the hot working gases flowing through the gas path. The heatshield 60 has a second surface or cold side surface 72 which is a radially outer surface relative to the hot gas flow and is supplied with coolant usually in the form of compressor air, but other sources of coolant can be used.

The heatshield 60 is mounted to the carrier 58 by a front hook or hanger 74 and a rear hook or hanger 76. The front hook 74 and the rear hook 76 engage with corresponding features 75 and 77 respectively of the carrier 58. Other or additional securing means for securing the heatshield to the carrier 58 or other supporting structure may be provided as known in the art.

The heatshield 60 has a centre-line 21 which when viewed radially inwardly towards the rotational axis 20 of the gas turbine 10 is parallel to the rotational axis 20. The heatshield 60 is generally symmetrical about its centre-line 21. The heatshield 60 is generally arcuate when viewed along centre-line 21 and its curvature is that of part of the circumferential surface of the array of heatshields 60 that forms the gas washed surface of the turbine section 18.

The main body 61 has an array of cooling channels 78 for conveying a coolant flow 80, which is supplied to the cold side 72 of the heatshield 60 via the carrier 58. The array of cooling channels 78 comprises a leading array 82 of cooling channels and a trailing array 84 of cooling channels. Each of the leading array 82 of cooling channels and trailing array 84 of cooling channels comprises parallel cooling channels 86 which each extend in a direction generally perpendicular to the respective leading edge 62 and trailing edge 64. Other arrangements of cooling schemes and concepts may be used in conjunction with the presently described heatshield 60.

Each cooling channel 86 of leading array of cooling channels 82 has an outlet 88 in the leading edge 62 and each cooling channel 86 of the trailing array of cooling channels 84 has an outlet 90 in the trailing edge 64 of the main body 61. Each cooling channel 86 has an inlet 92 formed in the second surface 72. Nonetheless, other forms, arrangements and positioning of inlet(s) can be used for the cooling channels such as those fed from a gallery or common feed.

In use, pressurised coolant 80, usually air bled from the compressor, is supplied via the carrier 58 to the cold side 72 of the heatshield 60. The coolant 80 enters the cooling channels 86 through the inlets 92, passes along the cooling channels 86 and is exhausted through the outlets 88, 90 at the leading, trailing and the lateral edges (not shown) respectively. Exhausting the coolant 80 at the edges of the heatshield 60 helps to prevent hot gas ingestion to the gaps surrounding the heatshield 60. Exhausting the coolant 80 at the edges of the heatshield also helps to prevent hotspots at and near to the edges of the heatshield 60. Further, any temperature gradient is minimised across the entire main body 61 of the heatshield 60.

Even though the cooling scheme attempts to minimise temperature gradients and absolute temperatures of the heatshield 60, the heatshield 60 can distort due to thermal loads and cause the blade tips to rub and/or increase gap sizes around the heatshield into which hot gases can escape the gas path. Conventionally, heatshields are stiffened by means of long ribs attached to, integrally or monolithically formed on the cold side surface 72 however, this arrangement has limited effect.

For the present heatshield 60, there is a stiffening structure 100 provided that extends from the leading hook 74 to the trailing hook 76 and which is free from contact or attachment to the second surface 72. In this way the stiffening structure does not deflect or distort when the main body 61 and hence second surface 72 is deformed. The stiffening structure 100 does not attach to the second surface or the main body 61 directly. The stiffening structure 100 is spaced apart from the second surface 72 and forms a gap 102 therebetween.

In an embodiment shown in FIGS. 2 and 3, the stiffening structure 100 is arranged in the general form of an X (or an X-shaped element) when looking towards the second surface 72 from a radially outward position. The dotted lines further indicate a generally regular X-shaped arrangement of the stiffening structure 100. The stiffening structure 100 has four arms generally referenced 104, with leading arms 104A, 104B located toward the leading edge 62 of the heatshield 60 and attached to the leading hook 74 and trailing arms 104C, 104D located towards the trailing edge 64 of the heatshield 60 and attached to the trailing hook 76.

Figure 4:
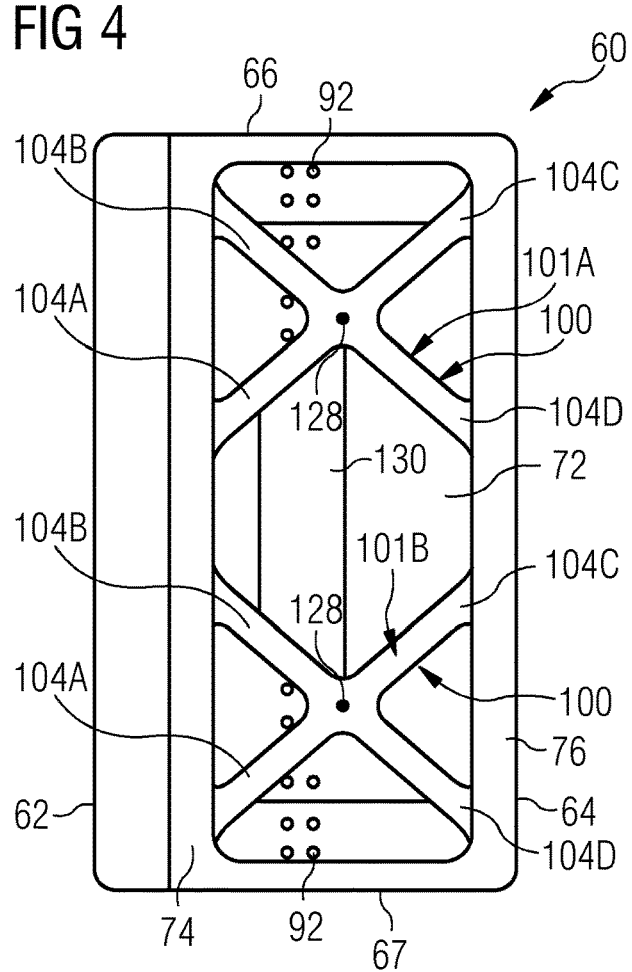
FIG. 4 is a view looking radially inwardly at an alternative embodiment of the heatshield and showing a second alternative stiffening structure.

FIG. 4 is a view looking radially inwardly at an alternative embodiment of the heatshield 60 and showing a second alternative stiffening structure 100. In this embodiment, there are two beam arrangements 101 (or X-shaped elements) forming the stiffening structure 100 and which are similar to that described with reference to FIG. 3 except that the optional extended portion 130 that shields the inlets 92 from the direct impingement of coolant 80 spans between the arm 104A of one beam arrangement 101A and the arm 104B of beam arrangement 100B.

Figure 5:
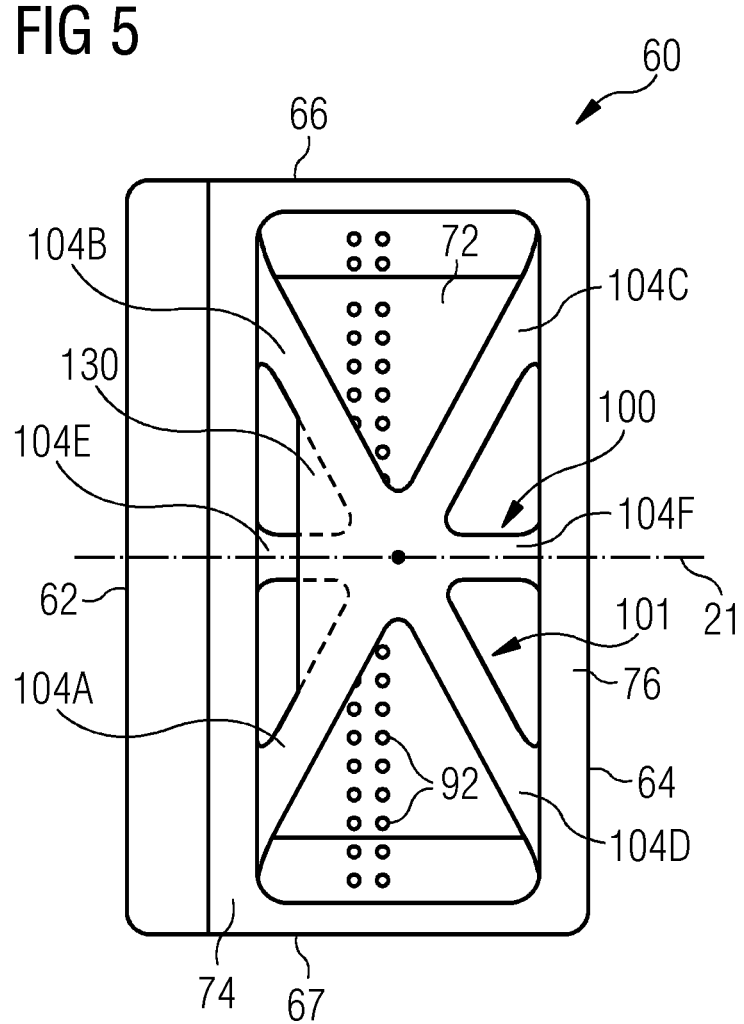
FIG. 5 is a view looking radially inwardly at an alternative embodiment of the heatshield and showing a third alternative stiffening structure.

FIG. 5 is a view looking radially inwardly at an alternative embodiment of the heatshield 60 and showing a third alternative stiffening structure 100. In this example, the stiffening structure 100 is similar to that shown and described with reference to FIGS. 3 and 4 except that there are two additional 'central' arms 104E and 104F. Arm 104E attaches to the forward hook 74 and arm 104F attaches to the rearward hook 76. Advantageously and as shown the two arms 104E and 104F are arranged in line with the centre line 21 of the heatshield 60. Indeed, the remaining arms 104A and 104B are symmetrical about centre line 21 as to arms 104C and 104D are also symmetrical about centre line 21.

All three embodiments of the stiffening structure 100 may be designed to accommodate and combat deformation of the heatshield 60. The key feature of the stiffening structure 100 is that it is not in direct contact with the second surface 72 and therefore not only does it remain relatively cool having no direct thermally conductive route (only via the hooks 74, 76), but it is also not subject to thermal distortion of the main body 61 and second surface 72 directly.

Figure 6:
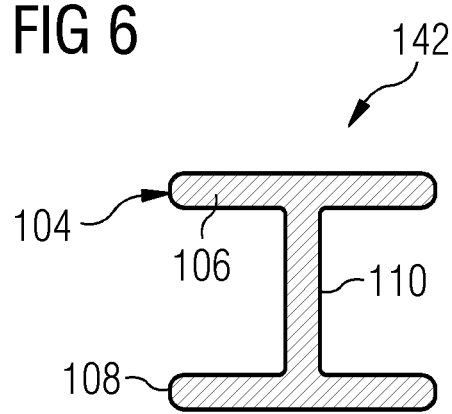
FIG. 6 is a first embodiment of a cross-section B-B through an arm of the stiffening structure of the present heatshield.

FIG. 6 is a section B-B, shown in FIG. 2, through an arm 104 of the stiffening structure 100. In section the arm 104 has the general shape of an I-beam 142 having two flanges 106, 108 and a web 110. The sizing of the I-beam 142 and sectional dimensions of the flanges 106, 108 and web 110 is well known in the art for accommodating loads to provide a required stiffness and limit deflections of the heatshield 60.

Figure 7:
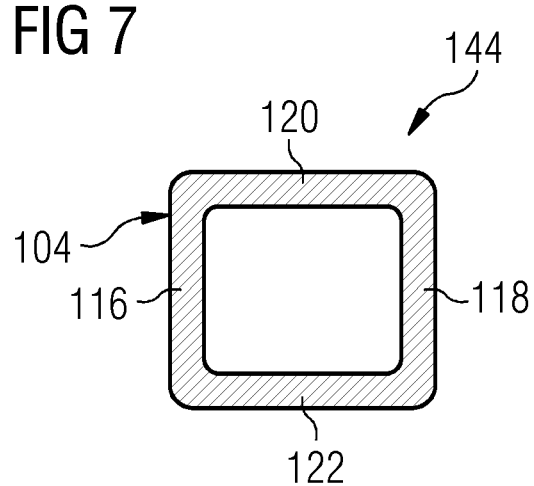
FIG. 7 is a second embodiment of the cross-section B-B through an arm of the stiffening structure of the present heatshield.

FIG. 7 is an alternative embodiment of section B-B, shown in FIG. 2, through the arm 104 of the stiffening structure 100. In section the arm 104 has the general shape of a box-beam 144 having, structurally-speaking, two flanges 116, 118 and two web 120, 122. The sizing of the box-beam 144 and sectional dimensions of the flanges 106, 108 and web 110 is well known in the art for accommodating loads to provide a required stiffness and limit deflections of the heatshield 60.

Figure 8:
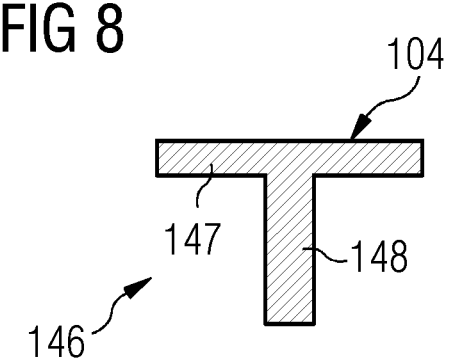
FIG. 8 is a third embodiment of the cross-section B-B through an arm of the stiffening structure of the present heatshield.

FIG. 8 is an alternative embodiment of section B-B, shown in FIG. 2, through the arm 104 of the stiffening structure 100. In section the arm 104 has the general shape of a T-beam 146 having, structurally-speaking, one flange 147 and one web 148. The sizing of the T-beam 146 and sectional dimensions of the flange 147 and web 148 is well known in the art for accommodating loads to provide a required stiffness and limit deflections of the heatshield 60.

Referring back to FIG. 2, a line 124 is defined in the circumferential direction and which is perpendicular to the centre line 21 of the heatshield 60. An angle α is defined between a centre-line 126 of an arm 104 and the line 124; and an angle β is defined between two arms 104. Where the heatshield 60 is manufactured by a 3D-printing process and based, from one lateral edge to the other lateral edge, the ratio of angles should be angle β/angle α≥2. One reason for this ratio is to ensure that there is a minimum angle of any feature that is 45° without being supported during the manufacturing process. Angle of features less than 45° requires supporting to give the necessary build quality and in this case an undesirable further machining process would be required to remove the supporting feature.

The centre-lines 126 of the arms 104 intersect at a point 128. Point 128 is mid-way between the two hooks 74, 76, but can be located within the middle third of the distance between the two hooks 74, 76. Point 128 is located on the centre line 21 of the heatshield 60. Indeed, the four arms 104 meet at an intersection 129 and within which is the point 128.

Referring to FIG. 3, the carrier 58 is generally annular and carries the annular array of heatshields 60 that surrounds the rotor stage as previously mentioned. The carrier 58 comprises an annular gallery or chamber 79 which is supplied with coolant 80. The carrier 58 has an aperture 81, one of an array of apertures 81 arranged about the carrier 58; each aperture 81 feeds a portion of the coolant 80 to one heatshield 60 of the array of heatshields 60 and each aperture 81 is arranged centrally with respect to the centre-line 21 of a respective heatshield 60.

The coolant 80 forms a jet of coolant that would otherwise impinge on the second surface 72 of the main body 61. This impinging jet of coolant 80 would cause a cold region and increase the temperature gradient across the main body 61. In addition, the inlets 92 are located radially inwardly of the aperture 81 or in other embodiments the inlets 92 may be located in-line with the jet of coolant 80 passing through the aperture 81. This jet of coolant 80 would otherwise impinge on the second surface 72 and some of the inlets 92 and cause an increase in the dynamic pressure of coolant entering these affected inlets 92. Therefore, some of the inlets 92 and their respective cooling channels 86 would otherwise have a greater mass flow of coolant therethrough compared to those inlets 92 and cooling channels 86 that are not impinged upon. This would otherwise cause irregular cooling of the main body 61 and potentially increase the temperature gradient thereacross and limit the longevity of the heatshield 60 or potentially cause the heatshield to distort with the previously mentioned disadvantages.

Therefore, to prevent the jet of coolant 80 that passes through the aperture 81 impinging on the second surface 72 and/or the inlets 92, the radially outer web 104 of the stiffening structure 100 has an extended portion 130 that extends between leading arms 104A, 104B. The extended portion 130 is located radially inwardly of the aperture 81 and is sized to cover at least the inlets 92 from the jet of coolant 80. In other words, there is no clear line-of sight between any part of the aperture 81 and the relevant inlets 92 in a direction of the jet of coolant 80. 'Relevant' inlets 92 meaning those inlets 92 that would otherwise be impinged upon were it not for the provision of the extended portion 130. FIG. 2 shows a dashed circular line 81P which is a projection of the aperture 81 onto the stiffening structure 100. In this example, the projection is along a centre-line 132 of the aperture 81 which is aligned with a radial line with respect to the centre-line 20 of the gas turbine engine 10 (see FIG. 3); however, the projection can be in the direction of the coolant 80 passing through the aperture 81. The aperture 81 may be arranged at an angle away from a radial line and therefore the centre-line 132 and direction of the jet of coolant 80 would also be angled away from the radial line. This angle may be in the circumferential direction and/or the axial direction.

It should be understood, for the reasons given above, extended portion 130 may extend between any one or more of the pairs of arms: arm 104A and arm 104B, arm 104B and arm 104C, arm 104C and arm 104D and arm 104A and arm 104D in order to block the jet of coolant 80 from impinging on the inlets 92 and/or second surface 72.

The arms 104 are provided with a radiused intersection or blend radius 134, 136, 138 where they join each other and/or the hooks 74, 76. Blend radius 134 is formed on an obtuse angle with the hooks 74, 76; blend radius 136 is formed on an acute angle with the hooks 74, 76; and the blend radius 138 is formed between any one or more of the pairs of arms: arm 104A and arm 104B, arm 104B and arm 104C, arm 104C and arm 104D and arm 104A and arm 104D. Specifically, in the FIG. 4 embodiment it is the webs 104, 108 that comprise the blend radius 134, 136, 138. In the FIG. 5 embodiment, the box-beam's two flanges 116, 118 and two webs 120, 122 will all comprise blend radii 134, 136, 138. The purpose of the radius is to reduce stress concentration at joints.

The stiffening structure 100 defines an aperture 140 between the front hook 74, the arms 104A and 104B and the extended portion 130 of the radially outer web 104 (or 120). The aperture 140 is shaped by virtue of the blend radii 136 and the extended portion 130 being of minimum size to deflect the jet of coolant 80. The aperture 140 allows coolant through to the second surface 72 so that the pressure of the coolant over the second surface 72 is as even as possible. Put another way, the overall area of the stiffening structure 100, when looking radially inwardly, is minimised and in consideration of a function of the structural stiffness/distortion requirements of the heatshield 60, deflection of the jet of coolant 80 via the extended portion 130 and the desire to evenly distribute the coolant 80.

By virtue of the jet of coolant 80 impinging on the stiffening structure 100 rather than the second surface 72 and/or inlets 92 an even distribution of pressure is present above the second surface 72 and therefore there is an even distribution of coolant into the inlets 92 and their respective cooling channels 86. Thus, in this way the temperature gradient is minimised across the main body 61 and stress/strains associated with temperature are minimised.

Referring now to FIG. 9 and FIG. 10; FIG. 9 is a view looking radially inwardly at an alternative embodiment of the heatshield 60 and showing a fourth alternative stiffening structure 100 and FIG. 10 is a cross-section C-C through the fourth alternative. In this embodiment the stiffening structure 100 is a lattice arrangement 150. The lattice arrangement 150 is a plate 152 having a thickness 154 which in this embodiment is approximately a constant thickness. Essentially, the lattice arrangement 150 is the plate 152 having an array of apertures 155 having a number of differently sized apertures 156, 158, 160 to suit the structural stiffening requirements or more accurately the remaining structure provides the required stiffness and structural performance to the heatshield. The lattice arrangement 150 shown in FIG. 9 is one example and is particularly suited to this heatshield 60; however, there are a multitude of different arrangements that are possible for this and other heatshield applications and stress-strain calculations are well known the skilled person in designing any particular arrangement to primarily stiffen the hooks 74, 76 whilst keeping the stiffening structure 100 free from direct contact with the second surface 72.

The lattice arrangement 150 has a frame 162 defining the periphery of the stiffening structure 100 and alternatively the lattice arrangement 100 may not have a frame 162.

The lattice arrangement 150 may have a regular arrangement of diamond-shaped apertures 156 with triangular-shaped apertures 158 against the edges or frame of the lattice arrangement. In this case the remaining material may form straight 'strips' of material in a conventional criss-cross pattern or array of X-shaped elements having arms. This array of X-shaped arms (these arms are analogous to the fours arms 104A, 104B, 104C, 104D meeting at an intersection 129), except that some arms of one X-shaped element are continuous with some of the arms of the next X-shaped element either in the direction from the leading hoot 74 to trailing hook 76 and/or from one lateral edge 66 to the other lateral edge 67. In section, these arms are generally rectangular 151 in shape as shown in FIG. 10.

The lattice arrangement 150 is connected to the leading hook 74 and trailing hook 76 along their circumferential lengths and performs the same structural benefits as previously described. The apertures 156, 158, 160 may be located and/or sized to also provide a shield, i.e. extended portion 130 shown in dashed lines, for the impingement of the cooling flow 80 as previously described.

The shape of the stiffening structure 100 is such that good quality manufacturing is possible, particularly considering an advantageous method is 3D-printing or additive-manufacturing. In this way, the stiffening structure 100 is formed integrally or is monolithic with the hooks 74, 76 and indeed the entire heatshield is monolithic, being built from a layer-by-layer continuous process. Thus 'printability' is a significant consideration in the design of the heatshield and the stiffening structure in particular. Nonetheless, one key feature is that the stiffening structure is detached from the main body 61 and/or second surface 72 of the additively-manufactured heatshield.

The present heatshield 60 is advantageous because it has increased stiffness to prevent distortion and is better sealed around its edges 62, 64, 66, 67 than previous designs; the addition of the stiffening structure 100 spanning directly between hooks 74 and 76 means that it is surrounded by coolant and does not directly pick up heat from the main body 61 and is therefore inherently stiffer than previous designs; the extended portion 130 improves even distribution of coolant into the inlets and cooling channels in the main body to provide a more evenly cooled main body 61 with associated benefits mentioned hereinbefore.

All these factors contribute to an increased life and/or temperature capability of the heatshield 60. Temperature capability meaning that the hot working gases can be at a higher temperature than before because of the improved heat management of the present heatshield compared to previous and conventional designs.

The presently described heatshield 60 is particularly suited to manufacture by an additive manufacturing process such as direct laser deposition, laser sintering, select laser melting or other 3D printing techniques. Specifically, the direction of formation of the heatshield 60 is, layer-by-layer, from one lateral edge towards the other and specifically in the direction of the line 124 in FIG. 2.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A heatshield for a gas turbine engine, the heatshield comprising:
   a main body having a leading edge, a trailing edge, lateral edges, a first surface and a second surface, the first surface being exposed to a hot working gas in use passing through the gas turbine engine,
   a leading hook and a trailing hook each extending between the lateral edges, the leading hook and the trailing hook extending from the second surface,
   a stiffening structure extending from the leading hook to the trailing hook and free from direct contact or attachment to the second surface; and
   wherein the stiffening structure is:
   a) a lattice structure, or
   b) arranged in a general form of at least one X when looking towards the second surface.

2. The heatshield as claimed in claim 1, wherein the stiffening structure is arranged in the general form of at least one X when looking towards the second surface.

3. The heatshield as claimed in claim 2, wherein the stiffening structure comprises four arms, with two of the four arms attaching to the leading hook and the other two of the four arms attaching to the trailing hook, with the fours arms meeting at an intersection.

4. The heatshield as claimed in claim 3, wherein the stiffening structure comprises an extended portion, with the extended portion extending between any one or more of pairs of arms, a first arm and a second arm , the second arm and a third arm , the third arm and a fourth arm , the first arm and the fourth arm, wherein in use, the extended portion blocks a jet of coolant from impinging on second surface and/or at least one inlet defined in the second surface.

5. The heatshield as claimed in claim 4, wherein a centre-line and a line perpendicular to the centre-line, where an angle ($\alpha$) is defined from the third arm to the line and an angle ($\beta$) is defined from the third arm to the fourth arm, both the third and fourth arms attached to the same leading or trailing hook, the ratio of angles being angle $\alpha$/ angle $\beta \geq 2$.

6. The heatshield as claimed in claim 4,
wherein the stiffening structure comprises one or more of the cross-sectional profiles: an I-beam, a T-beam, a box-beam or a rectangle.

7. The heatshield as claimed in claim 4,
wherein the stiffening structure is a beam arrangement, the beam arrangement comprising at least one beam, the at least one beam having at least one web and at least one flange.

8. The heatshield as claimed in claim 4,
wherein the extended portion is not connected to either of the leading hook or the trailing hook.

9. The heatshield as claimed in claim 7,
wherein the extended portion is formed by an extension of the flange.

10. The heatshield as claimed in claim 9,
wherein the extended portion is formed by an extension of a radially outer flange.

11. The heatshield as claimed in claim 1,
wherein the stiffening structure is the lattice structure.

12. The heatshield as claimed in claim 11,
wherein the lattice structure is an array of X-shaped elements, each X-shaped element having arms.

13. A gas turbine engine comprising:
the heatshield as claimed in claim 1, and
a carrier, wherein the carrier is positioned radially outwardly of the heatshield and comprising corresponding engagement features to engage the leading hook and the trailing hook, and
at least one aperture for directing a coolant therethrough and towards the heatshield, the at least one aperture having a centre-line,
wherein the centre-line intersects the stiffening structure such that the coolant at least partly impinges on the stiffening structure.

14. The gas turbine engine as claimed in claim 13,
wherein the stiffening structure comprises four arms and an extended portion extending between any one or more of pairs of arms, wherein in use, the extended portion blocks a jet of coolant from impinging on the second surface and/or at least one inlet defined in the second surface,
wherein the centre-line intersects the stiffening structure such that the coolant at least partly impinges on the extended portion.

15. The gas turbine engine as claimed in claim 13,
wherein the heatshield comprises one of an annular array of heatshields and the carrier is annular,
wherein the carrier comprises an annular array of apertures,
wherein the centre-line of each aperture is radially aligned with one of heatshields such that in use the coolant impinges on the heatshield.

16. The gas turbine engine as claimed in claim 15,
wherein the centre-line of each aperture is radially aligned with one of the stiffening structure such that in use the coolant impinges on the stiffening structure.

17. The heatshield as claimed in claim 1, wherein the stiffening structure is free from contact or attachment with the second surface such that a gap is formed between the stiffening structure and the second surface and such that the stiffening structure does not deflect or distort when the second surface is deformed.

18. The heatshield as claimed in claim 1, wherein the main body has an array of cooling channels for conveying a coolant flow that is supplied to the second surface via a carrier, wherein each cooling channel of the array has an outlet at the leading edge or trailing edge and an inlet formed in the second surface.

19. The heatshield as claimed in claim 18, wherein the array of cooling channels comprise:
a leading array of cooling channels comprising parallel cooling channels that extend in a direction generally perpendicular to the leading edge, wherein each cooling channel of the leading array has an outlet at the leading edge; and
a trailing array of cooling channels comprising parallel cooling channels that extend in a direction generally perpendicular to the trailing edge, wherein each cooling channel of the trailing array has an outlet at the trailing edge.

20. the heatshield as claimed in claim 1, wherein the stiffening structure is arranged in the general form of at least one X comprising a plurality of arms wherein each arm is offset from a direction between the leading edge and the trailing edge.

* * * * *